United States Patent [19]
Plemmons et al.

[11] 3,728,039
[45] Apr. 17, 1973

[54] FLUID COOLED POROUS STATOR STRUCTURE

[75] Inventors: Larry W. Plemmons, Hamilton; Charles E. Corrigan, Cincinnati, both of Ohio

[73] Assignee: General Electric Company, Lynn, Mass.

[22] Filed: Nov. 2, 1966

[21] Appl. No.: 591,462

[52] U.S. Cl. ................. 415/115, 415/178, 60/39.66
[51] Int. Cl. ............................................. F01d 5/14
[58] Field of Search ................ 253/34 C, 39.1, 39.15; 60/39–66; 415/115, 116, 117, 178

[56] References Cited

UNITED STATES PATENTS

| | | | |
|---|---|---|---|
| 2,685,429 | 8/1954 | Auyer | 253/39.1 |
| 2,720,356 | 10/1955 | Erwin | 253/39.15 B |
| 2,851,216 | 9/1958 | Scanlon et al | 253/39.15 B |
| 2,962,256 | 11/1960 | Bishop | 253/39 C |
| 3,034,298 | 5/1962 | White | 253/39.1 |
| 3,146,992 | 9/1964 | Farrell | 253/78 |

FOREIGN PATENTS OR APPLICATIONS 619,722  3/1949  Great Britain ................ 253/39.15 B Primary Examiner—Samuel Feinberg
Attorney—Frank L. Neuhauser, Oscar B. Waddell, Derek P. Lawrence, Edward C. Roman and Joseph B. Forman

[57] ABSTRACT

A cooling apparatus for a stator member of a high temperature turbo-machine wherein cooling fluid is caused to pass through said stator member thereby substantially cooling said member because of an existing pressure differential and high porosity characteristics of the stator member itself.

4 Claims, 7 Drawing Figures

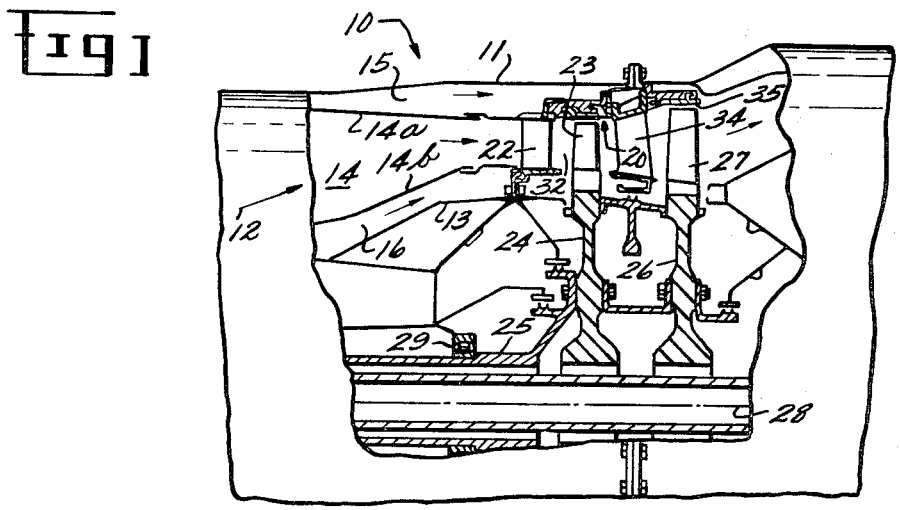
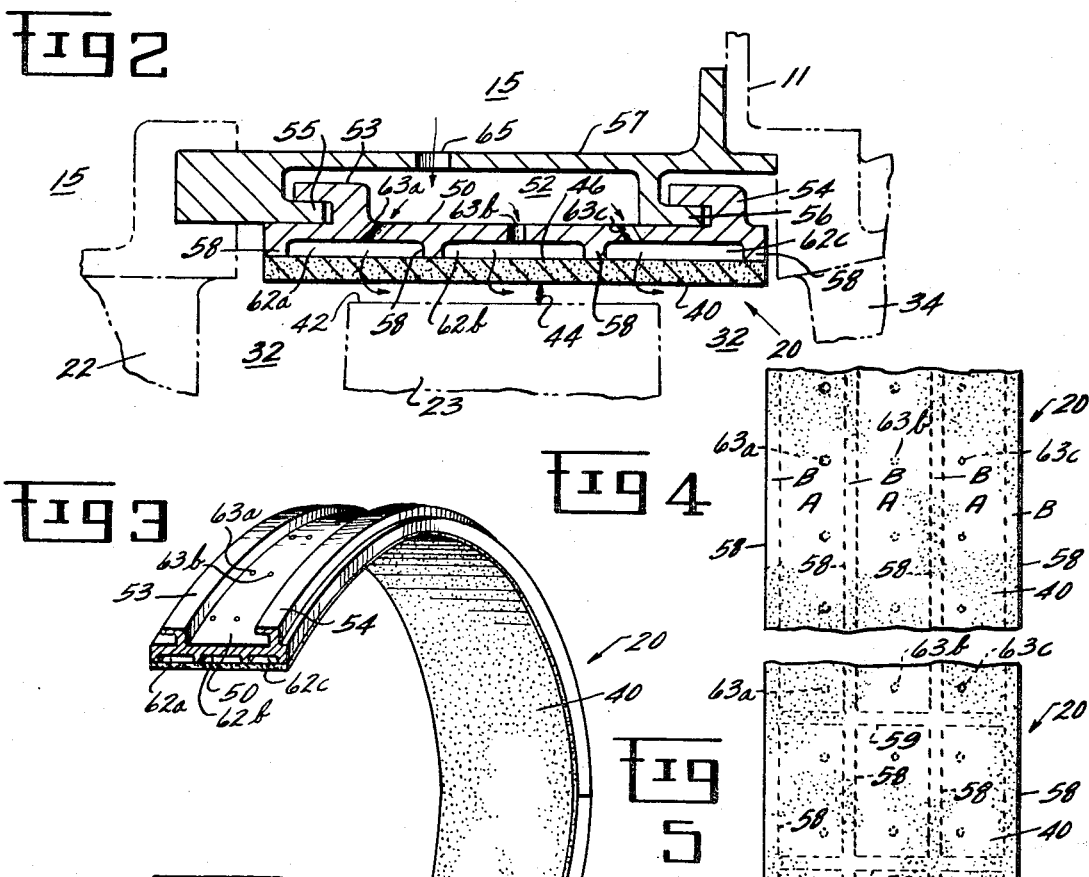

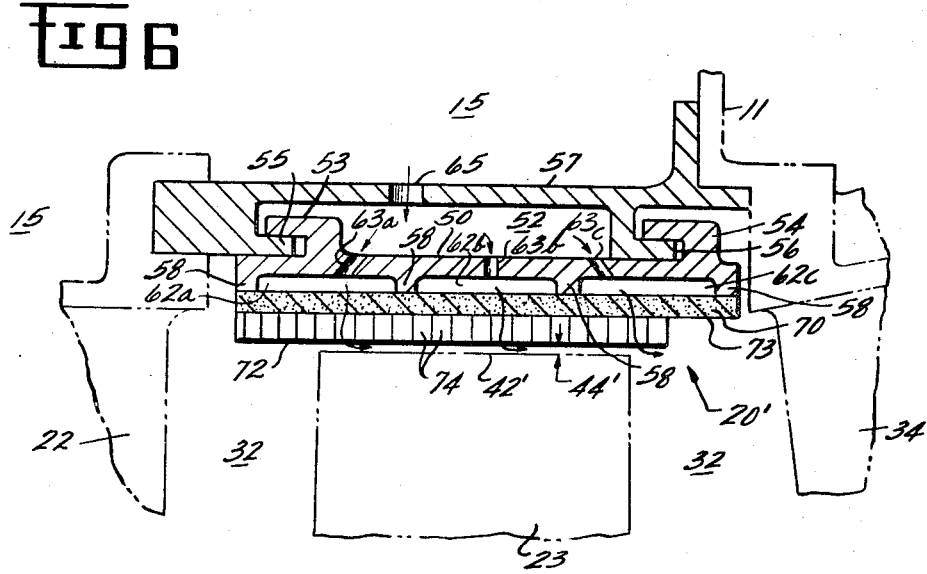
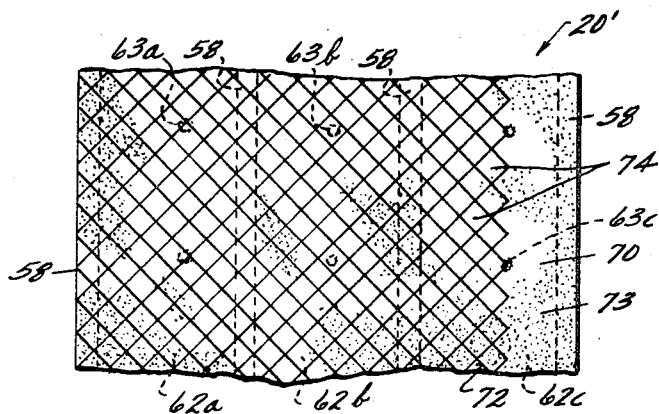

FLUID COOLED POROUS STATOR STRUCTURE

This invention relates to fluid cooled stator structure for high temperature turbomachinery and, more particularly, to porous turbine shrouds maintained at suitable operating temperatures by transpiration cooling.

It is well known that the efficiency of a gas turbine engine is related to the turbine operating temperature among other parameters and that the efficiency may be increased, in theory, by increasing the operating temperature. As a practical matter, however, the maximum turbine operating temperature is limited by the high temperature capabilities of the various turbine elements. Since the engine efficiency is thus also limited by temperature considerations, turbine designers have expended considerable effort toward increasing the high temperature capabilities of turbine elements exposed to the high temperature combustion gases, including the stationary shrouds which surround the rows of turbine buckets to prevent undesired leakage around the bucket tips. Some increase in engine efficiency has been obtained by the development and use of new materials capable of withstanding higher temperatures. These new materials are not, however, generally capable of withstanding the extremely high temperatures desired in modern gas turbines. Consequently, various cooling arrangements for shrouds and other turbine elements have been devised for extending the upper operating temperature limit by keeping the materials at the lower temperatures which they are capable of withstanding without suffering damage.

Cooling of annular turbine shrouds and similar stator structure, e.g., the arcuate bands which interconnect and support the ends of turbine nozzle vanes, has generally been accomplished by directing thin films of cooling fluid across the exposed surfaces to insulate the members from the hot gases. The fluid used to provide this type of cooling is typically compressed air bled from either the compressor or the combustor, the engine efficiency theoretically possible being reduced by the extraction of cooling air in this manner. It is therefore imperative that the cooling air be utilized effectively, lest the decrease in efficiency caused by the extraction of the air be greater than the increase resulting from the higher turbine operating temperature. In other words, the cooling system must be efficient from the standpoint of minimizing the quantity of cooling air while, of course, providing adequate cooling of all portions of the cooled member. In addition, a fully satisfactory cooling system should provide the cooling function without adversely affecting the other factors controlling overall engine performance and efficiency.

It has been found that film cooling arrangements used in the past for cooling turbine shrouds have tended to require excessive quantities of cooling air for reasons that are closely related to the aerodynamic flow characteristics within the turbine. To explain, it will be appreciated by those skilled in the art that each point on the surface of a typical shroud ring is passed by the equivalent of hundreds of thousands of bucket tips during each minute of engine operation, the number of equivalent bucket tips being the actual number of buckets comprising the row surrounded by the shroud times the speed, in revolutions per minute (rpm), of the row. It has been found in practice that this type of relative motion between the bucket tips and the shroud generates extremely turbulent flow and high heat transfer coefficients on the surface of the shroud. Because of this highly turbulent flow, film cooling air injected along the surface of the shroud is typically dissipated at an extremely rapid rate. Therefore, in order to maintain sufficient cooling capacity, it has been necessary in the past to inject relatively large quantities of film cooling air. As indicated above, however, these large quantities of cooling air, which may amount to as much as one or two percent of the total air flow through the engine, reduce the engine efficiency from that which would otherwise be attainable.

It is therefore an object of this invention to provide for high temperature turbomachines improved stator structure which is cooled by cooling fluid utilized in a highly efficient manner.

It is another object of this invention to provide for high temperature turbomachines improved stator structure constructed and cooled such that all portions of the stator structure are cooled adequately by a relatively small quantity of cooling fluid.

A further object of this invention is to provide a cooling arrangement for cooling turbine shrouds effectively with a relatively small quantity of cooling air, the quantity of cooling air utilized preferably being less than one percent of the total air flow through the engine.

Still another object of this invention is to provide an improved cooling arrangement for stator structure in accordance with the foregoing without adversely affecting other operating parameters which also contribute to overall engine performance and efficiency.

Briefly stated, in carrying out the invention in one form, a stator member in a high temperature turbomachine is comprised of porous material. One surface of the stator member is exposed to extremely high temperature motive fluid during turbomachine operation. Cooling fluid at a pressure higher than the pressure exerted on the stator member by the motive fluid is supplied to another surface of the stator member. Because of its porosity and the pressure differential existing across it, the stator member is permeated and thereby cooled during turbomachine operation by cooling fluid flowing between its high and low pressure surfaces. In accordance with the illustrated embodiments of the invention, the porous stator member is comprised of a material having minute passages interconnecting the wall surfaces, the material having its minute passages formed, as an integral part thereof, by randomly disposed and interconnected interstices.

By a further aspect of the invention, an annular turbine shroud in a gas turbine engine is constructed in accordance with the invention as described heretofore, the shroud being cooled by compressed air extracted from either the compressor or the combustor. The shroud is supported in the turbine by support means which limits the total area of the shroud that is exposed to the high pressure cooling air, the area and the permeability of the shroud being selected, in combination with the pressure drop across the shroud, such that the total flow of cooling air through the shroud is less than one percent of the total flow of motive fluid through the engine. By a still further aspect of the invention, an abradable material such as open honeycomb is secured to the inner surface of the porous material so that rubbing can occur between the shroud and the tips of the turbine buckets without adversely affecting the overall permeability of the shroud.

While the novel features of this invention are set forth with particularity in the appended claims, the invention, both as to organization and content, will be better understood and appreciated, along with other objects and features thereof, from the following detailed description taken in conjunction with the drawings, in which:

FIG. 1 is a sectional view of a portion of a gas turbine engine having a turbine shroud constructed and cooled in accordance with the present invention;

FIG. 2 is an enlarged view, also in cross-section, of the turbine shroud arrangement illustrated by FIG. 1;

FIG. 3 is a pictorial view, partially cut away, of the turbine shroud and its supporting structure;

FIG. 4 is a view taken along viewing line 4—4 of FIG. 2;

FIG. 5 is a view similar to FIG. 4 illustrating an alternative shroud support structure;

FIG. 6 is a view similar to FIG. 2 of a modified shroud construction; and

FIG. 7 is a view taken along viewing line 7—7 of FIG. 6.

Referring to the drawings, and particularly to FIG. 1, the high temperature portions of an axial flow gas turbine engine 10 are illustrated, the engine having an outer cylindrical casing 11 circumferentially surrounding the high temperature portions. The illustrated gas turbine structure includes an annular combustor indicated generally by the numeral 12, the combustor 12 being formed between the cylindrical casing 11 and an inner wall 13. An annular combustion liner comprised of outer and inner walls 14a and 14b, respectively, is located within the space 12 in spaced relation to the casing 11 and the wall 13, the actual combustion occurring within an annular space 14 enclosed by the combustion liner walls 14a and 14b. The annular spaces 15 and 16 between the combustion liner walls 14a and 14b and the casing 11 and the wall 13, respectively, are filled with high pressure air discharged by the compressor (not shown). This high pressure air, which is quite cool relative to the high temperature combustion gases within the space 14, is admitted in a controlled manner to the interior of the combustion liner to support combustion and provide cooling therein. In accordance with the present invention, this relatively cool air is also used for cooling a first stage turbine shroud 20 in a manner described below.

An annular nozzle diaphragm indicated generally by 22 in FIG. 1 is located at the downstream end of the combustor 12 for supplying the hot products of combustion to a first stage row of turbine buckets 23 at the proper velocity and at the proper angle. The turbine buckets 23 are peripherally mounted on a turbine wheel 24 which, along with its associated shaft 25 and a second turbine wheel 26 having a second stage row of turbine buckets 27 mounted thereon, is rotatably mounted on the engine axis 28 by suitable mounting means including a bearing arrangement 29. The turbine unit comprising the wheels 24 and 26 and the shaft 25 drives the compressor (not shown) of the engine 10.

With reference now directed to FIGS. 1 and 2, it will be noted that the motive fluid flows axially through an annular passageway 32, the vanes of the annular nozzle diaphragms 22 and 34 and the turbine buckets 23 and 27 radially spanning the passageway 32. If the gas turbine engine 10 is to operate at the efficiency and power levels desired in modern gas turbine engines, the combustion products must be discharged from the combustor 12 at temperatures higher than those which can be withstood without cooling by turbine structure made of currently available materials. The present invention helps make this desired efficiency possible by providing adequate cooling in a highly efficient manner for the first stage turbine shroud 20 which circumferentially surrounds the rows of turbine buckets 23 in closely spaced relationship. In the illustrated embodiment, the cooling arrangement of the invention is applied only to the annular shroud 20, but it will become clear as this description proceeds that the invention could be utilized in conjunction with either the second stage shroud 35 which surrounds the row of turbine buckets 27 or other stator structure exposed to the high temperature motive fluid. Those skilled in the art will appreciate, of course, that suitable cooling means may also be provided in an actual gas turbine engine operating at the temperatures envisioned herein for the airfoil-shaped vanes of the nozzle diaphragms 22 and 32 and the turbine buckets 23 and 27.

Turning attention now to FIGS. 2–4, the cooled shroud arrangement of this invention will be described. As illustrated, the shroud 20 is a relatively thin, annular ring having an inner annular surface 40 closely surrounding the outer tips 42 of the turbine buckets 23. Since the purpose of the shroud 40 is to prevent leakage of motive fluid around the outer tips 42 without performing work on the buckets 23, it will be appreciated that the radial space 44 between the tips 42 and the inner shroud surface 40 should be maintained as small as possible during steady state engine operation, consistent with transient expansion and contraction characteristics of the various turbine elements. It will also be appreciated that although the shroud 20 should ideally be a single, continuous band in order to provide maximum sealing, actual shrouds utilized in practice may be of segmented construction having suitable sealing means for preventing leakage through any necessary joints.

In accordance with the present invention, the shroud 20 is comprised of a porous material having a great number of minute passages interconnecting the inner annular surface 40 and an outer annular surface 46. These passages are preferably formed as an integral part of the material. There are a number of known materials having randomly disposed and interconnected interstices therein which form minute passages of the type desired for the shroud 20. These materials may be comprised of randomly disposed wires or woven wires which are sintered or brazed to form a composite structure having a certain degree of porosity. As an example of a suitable material, attention is directed to a co-pending application entitled, Abradable Material, Ser. No. 533,636, filed on Mar. 11, 1966, in the name of David R. Davis and assigned to the assignee of this invention.

Selected portions of the outer surface 46 of the shroud 20 are engaged by an annular support member 50 radially interposed between the shroud 20 and a plenum 52 inward of the casing 11 and a downstream continuation of the combustor space 15. The support member 50 includes upstream and downstream annular support flanges 53 and 54 which engage mating flanges 55 and 56 projecting inwardly from an annular bracket 57 to position the shroud 20 in its operative position relative to the tips 42 of the turbine buckets 23, the bracket 57 being in turn supported by the casing 11. More particularly, the annular support member 50 includes circumferential ridges 58 projecting inwardly from the support member to engage the outer surface 46 of the shroud 20, at least the extreme upstream and downstream ones and preferably all of the ridges 58 being secured to the shroud by suitable joining techniques such as certain forms of brazing and welding. As best illustrated by FIGS. 2 and 4, the shroud 20 and the support member 50 thus define a plurality of substantially closed annular regions 62a, 62b, and 62c communicating with the plenum 52 through openings 63a, 63b, and 63c, respectively, in the support member 50. In addition, the ridges 58 provide adequate support at spaced intervals for the porous shroud 20 which, because of its particular composition, is typically of low strength. If additional support is desired, the support member could also have axial ridges 59, as illustrated by FIG. 5, in addition to the circumferential ridges 58 the combined ridges 58 and 59 forming a large number of small arcuate spaces rather than the annular regions.

During engine operation, relatively low temperature air at compressor discharge pressure in the space 15 between the casing 11 and the combustion liner wall 14a is supplied through openings 65 in the bracket 57 to the plenum 52. From the plenum 52, the relatively cool air flows through the openings 63a, 63b, and 63c in the support member 50 to the respective regions 62a, 62b, and 62c. The openings 63a, 63b, and 63c and possibly the openings 65 are sized to meter the cooling air flow to maintain a substantially uniform pressure gradient across the shroud 20. Since it is well known that during engine operation the upstream end of the inner surface 40 of the shroud 20 will be exposed to higher pressure combustion gases than the downstream end, it will be obvious that the cooling air in the region 62a should be maintained at a higher pressure than the air in the region 62c. This means, of course, that the openings 63c should be smaller than the openings 63a in order to provide more throttling of the cooling air. In addition, by maintaining the pressure gradient low, 15 psi or less, the pressure loads on the low strength porous material comprising the shroud 20 are maintained at an acceptable level. The openings 63a, 63b, 63c, and 65 should be large enough to maintain the pressures within the regions 62a, 62b, and 62c higher at all times than the pressures acting on corresponding portions of the inner surface 40 of the shroud 20.

Because of the permeability of the shroud and the pressure differential across the shroud, the cooling air flows from the regions 62a, 62b, and 62c through the shroud 20 to the inner surface 40 and the annular motive fluid passageway 32 as illustrated by the arrows of FIG. 2. The shroud 20 is thus permeated and thereby cooled by cooling air during engine operation, the uniform pressure gradient across the shroud 20 assuring substantially uniform flow of cooling fluid throughout the shroud. This type of cooling in which a heat exchange fluid flows through a cooled member in a direction opposite to the direction of heat flow is known as "transpiration cooling." Other terms commonly applied to this type of cooling are "sweat cooling" and "effusion cooling." The heat absorbed by the cooling air is, of course, returned to the engine cycle when the air is discharged from the shroud's inner surface 40 into the annular passageway 32.

Since the cooling air actually passes entirely through the porous shroud 20, it will be appreciated by those skilled in the art that this invention provides for extremely effective heat transfer. For example, it has been found in one application that a shroud constructed and cooled in accordance with this invention can be held at an operating temperature of 1400°F, with a total air flow of only 0.36 percent of that of the motive fluid flowing through the passageway 32. If the same shroud were to be film cooled with air injected along the inner shroud surface 40 where it could be rapidly dissipated by the turbulent flow conditions, the air flow requirements would increase to 1.00 percent in order to hold the shroud to a higher operating temperature of 1800°F. Furthermore, tests have disclosed that the transpiration cooling arrangement of this invention also aids in stabilizing the boundary layer and reducing the turbulence existing along the inner shroud surface 40. As a result, the cooling arrangement increases efficiency and performance not only by requiring less cooling air flow, but also by reducing the total pressure losses associated with the turbulent flow.

For optimum operation, the cooling air flow through the shroud 20 should be sufficient, but not excessive, to maintain the shroud at a desired operating temperature. To provide the correct flow, there are a number of variables which can be controlled by the turbine designer. For example, the porosity of the materials used can be varied within limits, and the designer can therefore exercise judgment in the selection of a material for the shroud 20. In addition, the thickness of the shroud, the pressure gradient across the shroud, and the area exposed to the high pressure cooling air can all be varied within limits to vary the overall permeability of the shroud construction. With respect to the possibility of area variation, attention is directed to FIG. 4 where it will be noted that only the areas A of the outer surface 46 of the shroud 20 are contacted by the high pressure cooling air in the regions 62a, 62b, and 62c. The areas B contacted by the ridges 58 are blocked from the high pressure air. To avoid hot spots on the shroud 20, this approach should not be used to block off large areas; in this respect, it will be obvious that more uniform cooling will be obtained by using several uniformly spaced regions each having modest area A than by using a single region having the same total area. From the foregoing, it will thus be appreciated that the flow through the shroud 20 is controlled in accordance with the overall permeability of the shroud, the overall permeability depending upon a number of factors including the pressure differential across the shroud, the porosity of the shroud material, the shroud thickness, and the area exposed to the high pressure air. It will be obvious that extreme care should be taken to prevent excessive pressure drops through the openings 65 and 63a, 63b, and 63c since such pressure drops could render the local pressures on the inner shroud surface 40 higher than the corresponding pressures within the local regions 62a, 62b, and 62c. The result would be reversal of flow into the regions and, consequently, rapid destruction of the shroud 20.

If the porous material comprising the shroud 20 were sufficiently strong to withstand the accompanying pressure loads, there would be no reason why the entire pressure drop could not be taken across the shroud, provided that the other design variables were adjusted accordingly to provide an adequate, but not excessive, total flow rate. Such an arrangement would, however, not enjoy several of the advantages of the embodiments illustrated and described herein. For example, such a shroud would not have a uniform flow pattern since the inner shroud surface is, as discussed above, exposed to the non-uniform pressure distribution of the motive fluid in the passageway 32. The throttling openings 63a, 63b, and 63c thus provide a way of providing uniform cooling across the various portions of the shroud 20. Furthermore, it has been found that an arrangement which relies on throttling and relatively low pressure gradients across the shroud is less susceptible to changes in flow rate in the event of blockage of the minute passages of the shroud 20 by foreign objects such as dirt since the blockage will cause a pressure rise in the regions 62a, 62b, and 62c and, therefore, greater flow through the unblocked passages. Similarly, it has been found that this arrangement is also less susceptible to changes in flow rate as a result of localized pressure variations within the motive fluid acting on the inner surface 40 of the shroud 20.

Consideration is now directed to FIGS. 6 and 7 where a modified shroud 20' constructed in accordance with this invention is illustrated, the shroud 20' including an annular, porous shroud ring 70 similar to the shroud 20 of FIGS. 1-5 and an annular band 72 of abradable material such as open cell honeycomb secured to the inner surface 73 of the shroud ring 70 by suitable joining techniques such as certain forms of brazing.

Before discussing the modified shroud construction, it will be well to review briefly certain transient conditions which occur in gas turbine engines. In this respect, it was pointed out above with respect to FIG. 2 that the radial space 44 between the outer tips 42 of the buckets 23 and the shroud 20 should be maintained as small as possible during steady state engine operation in order to minimize leakage of motive fluid around the tips 42 without performing work on the buckets 23. Due to differences in expansion and contraction rates between the shroud and other stator structure and the turbine rotor structure, the clearance 44 varies under different operating conditions. If the shroud construction of FIGS. 1-5 is utilized, it is desirable that rubbing not occur between the bucket tips 42 and the inner surface 46 of the shroud 20 since it has been found that rubbing will reduce the permeability of the shroud. As a result, the shroud 20 may become overheated during subsequent operation since the transpiration cooling level will be reduced. To prevent the possibility of such an occurrence, a shroud 20 of the form illustrated by FIGS. 1-5 will be assembled with a clearance sufficient to assure that substantial rubbing does not occur even during the most severe conditions or relative thermal growth. This, of course, requires that a substantial "margin of safety" be provided in the assembly clearance, the result being an operating clearance 44 as shown in FIG. 2.

By securing the annular band 72 of open honeycomb material to the inner surface 73 of the shroud ring 70 as illustrated by FIGS. 6 and 7, rubbing can occur between the bucket tips 42' and the honeycomb band 72 without any effect on the permeability of the shroud ring 70. As a result, the assembly clearance can be much smaller since the "margin of safety" can be effectively ignored. Assuming that severe rubbing of the type that would be required to produce the extreme operating clearance 44 of FIG. 2 does not occur during operation, the shroud 20' of FIGS. 6 and 7 will have a significantly smaller operating clearance 44'. The practical result is, of course, substantially reduced tip leakage during engine operation.

The shroud ring 72 is comprised of open celled metallic honeycomb material that has well known abradable characteristics, its relative large openings forming a continuation of the minute passages of the shroud ring 70 and assuring that cooling air flow will not be prevented as a result of rubbing. As an example of the type of honeycomb material utilized in the shroud ring 72, attention is directed to U.S. Pat. No. 2,963,307 entitled "Honeycomb Seal," issued on Dec. 6, 1960, to Melvin Bobo and assigned to the assignee of this invention. Materials other than metallic honeycomb could be used in the practice of this invention, provided that the materials are readily abradable, are able to withstand relatively high temperatures, and have relatively large passages therein which will not be blocked as a result of rubbing. Care should be taken in selecting a joining technique for securing the honeycomb or other abradable band 72 to the porous shroud ring 70 since some joining techniques can adversely affect the porosity of the shroud ring 70. In this respect, it has been found that it may be desirable to form the porous shroud ring 70 with a non-homogeneous composition with a relatively coarse structure on the surface to which the honeycomb is to be secured, the coarse structure being less susceptible to blockage.

During engine operation, the entire shroud 20' including the porous shroud ring 70 and the abradable band 72 is transpiration cooled by cooling air flowing inwardly through the minute passages of the porous shroud ring 70 and the large passages 74 of the honeycomb shroud ring 72 as illustrated by the arrows in FIGS. 6 and 7. The cooling metering characteristics of the shroud construction of FIGS. 6 and 7 are substantially identical to those discussed above with respect to FIGS. 1-5 and will, therefore, not be described in detail at this point.

The invention has been described wholly in connection with the annular shrouds 20 and 20' surrounding the turbine buckets 23. As pointed out previously, however, it will be appreciated that the shroud 35 which surrounds the turbine buckets 27 or other stator structure exposed to high temperature motive fluid, e.g., the annular support bands of the turbine nozzle diaphragms 22 and 23, could also be cooled in accordance with this invention. In addition, various modifications in the structural arrangement described herein will be obvious to those skilled in the art.

It is thus seen that this invention provides improved stator structure that is constructed and cooled such that all portions of the stator structure are cooled adequately by a relatively small quantity of cooling fluid without adversely affecting other engine operating parameters.

It will be understood that the invention is not limited to the specific details of the construction and arrangement of the particular embodiments illustrated and described herein. It is therefore intended to cover in the appended claims all such changes and modifications which may occur to those skilled in the art without departing from the true spirit and scope of the invention.

What is claimed as new and is desired to secure by Letters Patent of the United States is:

1. In a gas turbine engine including a compressor, a combustor and a turbine, fluid cooled turbine apparatus comprising:
   a row of circumferentially spaced-apart turbine buckets mounted for rotation about an axis, said turbine buckets extending radially of said axis across an annular passageway for the flow of high temperature motive fluid during engine operation,
   an annular porous shroud circumferentially surrounding the outer tips of said turbine buckets in closely spaced relation thereto so as to control leakage of high temperature motive fluid around the tips during engine operation,
   means for supplying cooling fluid to at least a portion of the outer surface of said shroud during engine operation at a pressure higher than the static pressure exerted on the inner surface of said shroud by high temperature motive fluid in the annular passageway,
   means defining a plenum radially outward of said shroud,
   annular support means radially interposed between said annular shroud and said plenum for supporting said annular shroud,
   said support means engaging said shroud and having passages therein such that only a portion of the outer surface of said shroud is in fluid communication with means defining said plenum,
   an annular member circumferentially surrounding said annular shroud and having a plurality of axially spaced circumferential ridges projecting radially inward into contact with said shroud such that at least two substantially closed axially spaced annular regions are formed between said annular member and said shroud,
   said annular member having passages therein providing fluid communication between the means defining a plenum and said annular regions for supplying cooling air to said annular regions,
   said passages being sized to maintain a substantially uniform pressure drop across said shroud during engine operation whereby said shroud is cooled in a substantially uniform manner.

2. Air cooled turbine apparatus as defined by claim 1 further comprising a layer of abradable material on the inner surface of said shroud, said abradable material having relatively large passages therein for permitting substantially unrestricted flow of cooling air therethrough even subsequent to rubbing between the tips of said turbine buckets and said shroud.

3. In a gas turbine engine including a compressor, a combustor, and a turbine, fluid cooled turbine apparatus comprising:
   a row of circumferentially spaced-apart turbine buckets mounted for rotation about an axis, said turbine buckets extending radially of said axis across an annular passageway for the flow of high temperature motive fluid during engine operation,
   an annular porous shroud circumferentially surrounding the outer tips of said turbine buckets in closely spaced relationship thereto so as to control leakage of high temperature motive fluid around the tips during engine operation,
   means for supplying cooling fluid to at least a portion of the outer surface of said shroud during engine operation at a pressure higher than the static pressure exerted on the inner surface of said shroud by high temperature motive fluid in the annular passageway,
   annular support means radially interposed between said annular shroud and a plenum, located radially outward of said shroud, for supporting said annular shroud,
   said support means engaging said shroud and having passages therein such that only a portion of the outer surface of said shroud is in fluid communication with said plenum,
   an annular member circumferentially surrounding said annular shroud and having a first plurality of axially spaced circumferential ridges and a second plurality of circumferentially spaced axial ridges projecting radially inward into contact with said shroud such that a plurality of substantially closed arcuate regions are formed between said annular member and said shroud,
   said annular member having passages therein providing fluid communication between said plenum and said arcuate regions for supplying cooling air to said arcuate regions, said passages sized to maintain a substantially uniform pressure drop across said shroud during engine operation whereby said shroud is cooled in a substantially uniform manner.

4. Air cooled turbine apparatus as defined by claim 3 further comprising a layer of abradable material on the inner surface of said shroud, said abradable material having relatively large passages therein for permitting substantially unrestricted flow of cooling air therethrough even subsequent to rubbing between the tips of said turbine buckets and said shroud.

* * * * *